United States Patent [19]

Muto

[11] Patent Number: 4,680,161
[45] Date of Patent: Jul. 14, 1987

[54] METHOD OF PRODUCING SLIDING COMPOSITE MATERIAL

[75] Inventor: Takashi Muto, Nagoya, Japan

[73] Assignee: Daido Metal Company Ltd., Nagoya, Japan

[21] Appl. No.: 896,018

[22] Filed: Aug. 13, 1986

[30] Foreign Application Priority Data

Sep. 2, 1985 [JP] Japan .................................. 60-193384

[51] Int. Cl.⁴ .............................................. B22F 5/00
[52] U.S. Cl. .......................................... 419/3; 419/23; 419/28; 419/55; 419/58; 428/457; 428/552; 428/557; 428/564; 428/653; 428/677
[58] Field of Search .................. 419/3, 23, 55, 28, 58; 428/552, 557, 564, 457, 653, 677

[56] References Cited

U.S. PATENT DOCUMENTS

| | | | |
|---|---|---|---|
| 3,194,658 | 7/1965 | Storchheim | 419/55 |
| 3,325,280 | 6/1967 | Horn et al. | 419/55 |
| 3,365,777 | 1/1968 | MacDonald et al. | 419/55 |
| 3,720,511 | 3/1973 | Davies et al. | 419/55 |
| 3,839,026 | 10/1974 | Gibbon et al. | 419/55 |
| 4,602,954 | 7/1986 | Davies et al. | 419/55 |

FOREIGN PATENT DOCUMENTS 773722 6/1955 United Kingdom.
1555981 11/1979 United Kingdom.

Primary Examiner—Stephen J. Lechert, Jr.
Attorney, Agent, or Firm—Browdy and Neimark

[57] ABSTRACT

A method of producing a sliding composite material. The method comprises the step of: forming an adhesive layer bonded to the surface of a metal strip by sintering a powder for the adhesive layer which contains no solid lubricant and which is disposed onto the surface of the metal strip; forming a surface layer by sintering another powder for the surface layer which contains a solid lubricant and which is disposed onto the sintered adhesive layer; and rolling the resulting layers and the metal strip to obtain the composite material.

5 Claims, 1 Drawing Figure

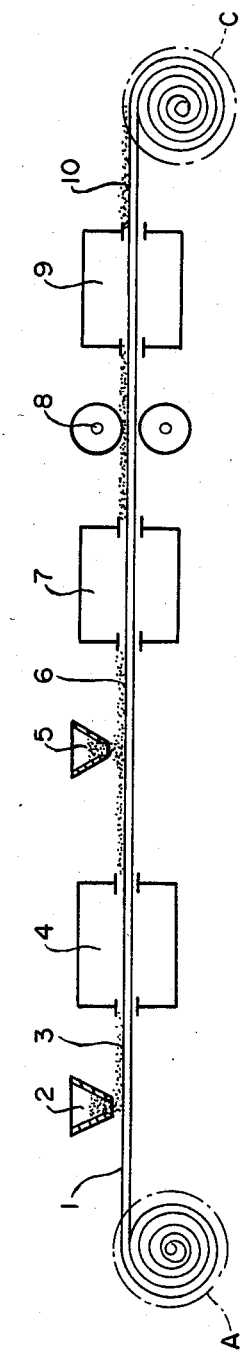

METHOD OF PRODUCING SLIDING COMPOSITE MATERIAL

BACKGROUND OF THE INVENTION

The present invention relates to a method of producing a sliding composite material suitable for use in sliding parts such as plain bearings.

The prior arts of the present invention are described below under items (A), (B) and (C):

(A) Japanese Patent Laid-Open Publication No. 79407/1975 discloses, in claim 1, a method of manufacturing a spiral bushing which method comprises the steps of disposing an alloy powder (with a grain size of 80 to 200 mesh) as an adhesive layer on the surface of a metal plate, sintering the plate provided with the powder, disposing another alloy powder (of the same chemical composition as above but with a grain size of 80 to 450 mesh) as a surface layer on the surface of the sintered plate, sintering the plate, cutting the sintered plate, forming the cut plate to a spiral shape, welding the mating portions of the spirally formed plate so as to make an integral structure, and machining it into a spiral bushing. However, bushings manufactured by this method suffer from a relatively small bonding strength between the adhesive layer and the surface layer.

(B) Japanese Post-Exam Patent Publication No. 67/1961 discloses a method for manufacturing a three-layered composite material and a method for manufacturing a four-layered composite material. The three-layered composite manufacturing method comprises the steps of disposing a powder which does not contain graphite onto the surface of a metal plate as an adhesive layer, further disposing another powder containing graphite onto the former powder which another powder is to be formed as a surface layer, subjecting these to compression forming, and sintering the composite plate. The four-layered composite material manufacturing method comprises the steps of disposing a powder, which does not contain graphite, on the surface of a metal plate as an adhesive layer, further disposing thereon a mixed powder which contains a relatively small amount of graphite, furthermore disposing thereon a powder which contains a relatively large amount of graphite as a surface layer, subjecting the thus prepared plate to compression forming, and finally sintering the composite plate. However, both of these methods suffer from problems. For example, when disposing powders for two or three layers, the powders are apt to be mixed each other, or the layers may be reversed in position. The problems are particularly serious when the powder for the adhesive layer has to be thinly disposed, because the powder is apt to be mixed with powders in accumulated layers, which sometimes results in nonformation of the adhesive layer. Further, it is not advantageous with respect to operation efficiency to compress the metal powders by a pressing machine.

(C) The gist of U.S. Pat. No. 3,812,563 is a method of manufacturing a three-layered composite material. More specifically, it discloses a method of bonding a bearing material layer to a metal substrate which comprises the steps of disposing a powder as an adhesive layer onto the surface of a metal plate, further disposing thereon a powdered bearing material as a surface layer, sintering the thus prepared plate, and finally hot rolling the sintered plate. According to this method, the types of the powders for the adhesive layer and the surface (bearing) layer, and the contents of the components of the powders are not limited, but can be selected as desired.

However, in this method, the powders are disposed as accumulated powder layers in the same manner as in the method (B), and therefore the above method also suffers from the same problems as in the method (B). That is, when disposing powders as the accumulated layers, the powders are apt to be mixed each other or the powdered layers are apt to be reversed in position. Particularly, when the powder for the adhesive layer has to be thinly disposed, the powder is apt to be mixed with adjacent powders in accumulated layers, thus sometimes resulting in non-formation of the adhesive layer.

SUMMARY OF THE INVENTION

Accordingly, an object of the present invention is to solve the problems of the prior arts described above in item (A) to (C).

To this end, the present invention provides a method of producing a composite sliding material having a metal strip, an adhesive layer bonded to the metal strip and surface layer bonded to the adhesive layer, comprising the steps of:

preparing the metal strip, a powder for the adhesive layer which powder contains no solid lubricant, and another powder for the surface layer which powder contains a solid lubricant;

disposing the powder for the adhesive layer onto the metal strip;

sintering the powder for the adhesive layer so that the adhesive layer bonded to the metal strip is formed;

disposing said another powder for the surface layer onto the sintered adhesive layer;

sintering said another powder disposed on the adhesive layer so that the surface layer bonded to the adhesive layer is formed; and subjecting to a rolling operation the sintered surface layer and the adhesive layer bonded to the metal strip.

A particularly important characteristic of the present invention is that the above adhesive layer prepared just after the first sintering is roughly formed so that it has a large surface area and many irregularities. Thus, the surface layer powder containing solid lubricant can be well anchored by virtue of the large contact area and irregularities of the adhesive layer. Further, by rolling the layered and sintered metal strip by roller means, the sintered layers are compacted, so that the strip can be lined with the layers stable manner and with a large bonding strength.

Preferably, the metal strip may be steel plate or steel plate plated with copper.

Preferably, the powder for the adhesive layer may be of a copper base alloy or an aluminum base alloy, with a grain size of 80 to 120 mesh.

Preferably, the powder for the surface layer may be a mixture of a copper base or aluminum base alloy and a solid lubricant such as a graphite powder.

Preferably, the composite obtained from the rolling may have a theoretical density of 75 to 98%.

BRIEF DESCRIPTION OF THE DRAWING

The single FIGURE is a drawing schematically showing the arrangement of a production system employed in embodying the method in accordance with the present invention.

DESCRIPTION OF THE PREFERRED EMBODIMENT

The present invention will be clearly understood from the preferred embodiment thereof described below. The preferred embodiment is an example embodying the present invention, and the present invention should not be limited to the preferred embodiment but may be carried out in various embodiments within the scope of the claims.

(EXAMPLE)

Referring to the FIGURE, a metal strip 1 (which is a steel plate plated with copper to a thickness of 6 to 13 μm) having a thickness of 0.75 to 4.35 mm was uncoiled from an uncoiler A. A first disseminator 2 evenly disposed a copper base alloy powder layer 3 (10% tin - copper) which powder had a grain size of 80 to 120 mesh and which is to be formed into an adhesive layer onto the surface of the metal strip 1, the thickness of which powder 3 was 0.15–0.35 mm so that a final thickness of the adhesive layer may be within the range 0.10 to 0.30 mm. The powder-disposed strip was then led to a first sintering furnace 4 to be sintered in an atmosphere containing hydrogen gas and nitrogen gas at a temperature of 760° to 810° C. for 2 to 15 minutes. Thereafter, a second disseminator 5 disposed a copper base alloy powder layer 6 (10% graphite-10% tin-copper, the graphite being an example of the solid lubricant) of 0.45–3.00 mm in thickness onto the sintered surface of the adhesive layer.

After the disposition of the powder for the surface layer was finished, the strip 1 was led to a second sintering furnace 7 to be sintered at the same sintering temperature as above for 5 to 25 minutes. After the second sintering was finished, the strip 1 was then led between the rollers of a rolling mill 8 to be rolled so as to have a theoretical density of 75 to 98%.

Thereafter, the rolled strip 1 was led to a third sintering furnace 9 to be sintered at the same sintering temperature as above for 5 to 25 minutes. After the third sintering was finished, the thus obtained sliding composite (four-layered) material 10 was coiled on a coiler C. Further, the sliding composite material obtained from the third sintering may be subjected to further rolling and/or sintering, if it is required by in view of the mechanical properties such as hardness of the resultant sintered layer. Further, although in the foregoing embodiment the third sintering was effected, this step may be omitted, depending on the intended use of the composite material. Still further, although in the foregoing embodiment copper or copper base alloy powders were used, this is not essential and other alloy powders such as pure aluminum powders and aluminum base alloy powders may be used.

As compared to the sliding composite manufacturing methods of the above-mentioned prior arts (A), (B) and (C), the adhesive layer of the present invention is roughly formed so that it has a large surface are and irregularities, thereby affording an anchor effect to the surface layer powder containing solid lubricant by virtue of both the large contact area with the adhesive layer and the irregularities. Further, since the method of the invention includes the step of rolling the layered and sintered metal strip by roller means as an essential step, the strip can be made compact. In this way, according to the method of the invention, a sliding composite material with an adhesive strength greater than those of the composite material of the prior methods has been obtained, thereby achieving the object of the invention.

Further, as compared to the prior method (B) in which the metal strip is moved in such an intermittent manner that the movement of the strip is temporarily interrupted when the strip is compressed by the pressing machine, the method of the present invention enables a continuous movement of the strip by using a rolling mill through which the strip can be moved without interruption. Therefore, the method of the invention can produce a sliding composite material within a shorter production time, which is a feature suitable or mass production, while superior in respect of practicality and economization.

What is claimed is:

1. A method of producing a composite sliding material provided with a metal strip, an adhesive layer bonded to the metal strip and surface layer bonded to the adhesive layer, comprising the steps of:
    preparing the metal strip, a powder for the adhesive layer which powder contains no solid lubricant, and another powder for the surface layer which powder contains a solid lubricant;
    disposing the powder for the adhesive layer onto the metal strip;
    sintering the powder for the adhesive layer so that the adhesive layer bonded to the metal strip is formed;
    disposing said another powder for the surface layer onto the sintered adhesive layer;
    sintering said another powder disposed on the adhesive layer so that the surface layer bonded to the adhesive layer is formed; and
    subjecting to a rolling operation the sintered surface layer and the adhesive layer bonded to the metal strip.

2. A method as claimed in claim 1, wherein said metal strip is a steel plate or a steel plate plated with copper.

3. A method as claimed in claim 1, wherein said powder for the adhesive layer is a powder of a copper base alloy or an aluminum base alloy, which has a grain size of 80 to 120 mesh.

4. A method as claimed in claim 1, wherein said powder for the surface layer is a mixture of a powder of a copper base alloy or an aluminum base alloy and a graphite powder.

5. A method as claimed in claim 1, wherein said second sintering and said rolling are effected such that said composite has a theoretical density of 75 to 98%.

* * * * *